Figure 1:
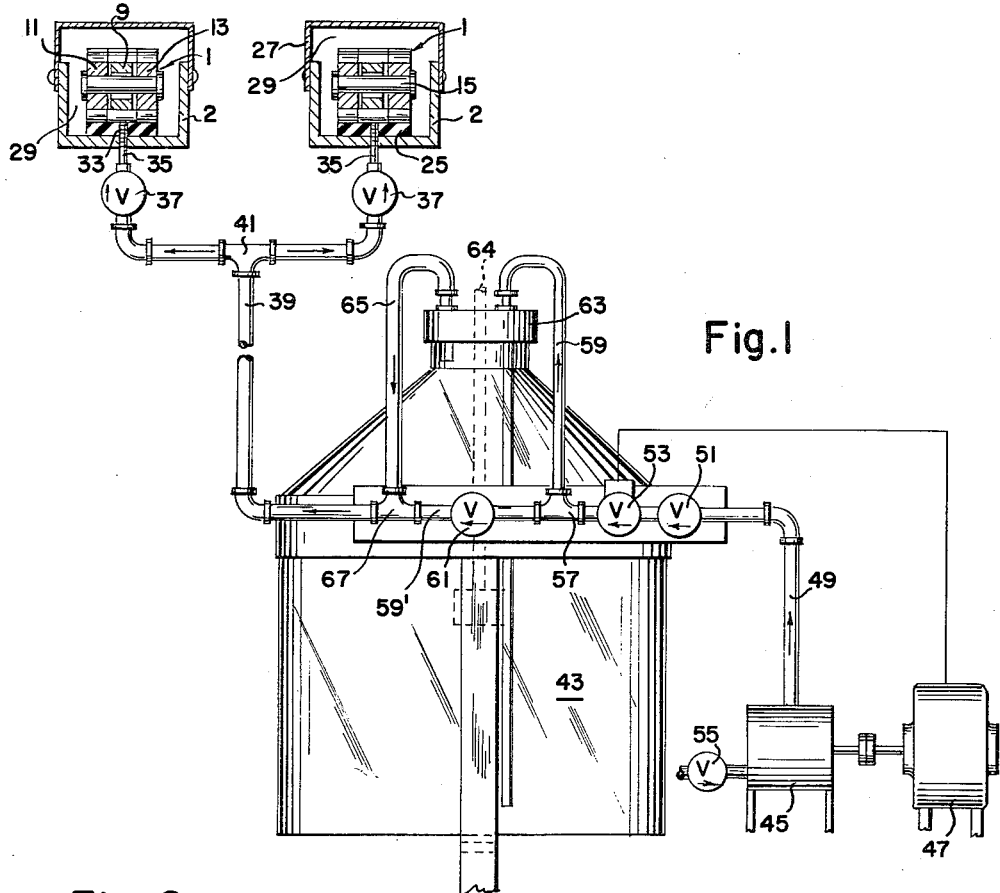

Aug. 28, 1962 — R. L. BATCHELOR — 3,051,264
LUBRICATION SYSTEM AND METHOD FOR CHAIN CONVEYOR
Filed Oct. 14, 1960 — 2 Sheets-Sheet 1

INVENTOR.
Robert L. Batchelor
BY Curtis, Morris, & Safford
ATTORNEYS

INVENTOR.
Robert L. Batchelor
BY
Curtis, Morris, & Safford
ATTORNEYS

/ 
United States Patent Office 3,051,264
Patented Aug. 28, 1962

3,051,264
LUBRICATION SYSTEM AND METHOD FOR CHAIN CONVEYOR
Robert L. Batchelor, 87 Mackay Drive, Tenafly, N.J.
Filed Oct. 14, 1960, Ser. No. 62,700
5 Claims. (Cl. 184—15)

This invention relates to lubricating systems and, more particularly, to lubricating systems for conveyor systems of the drag-chain type.

Conveyor systems of the drag-chain type are used extensively in food processing, dairy, breweries, bottling plants, etc., to provide for the transport of container packages, i.e. crates, cartons, cans, etc. Such conveyor systems employ a transport mechanism upon which the container packages are supported and carried along between separated points in the plant. Due to severe operating conditions, such transport mechanisms generally comprise a flexible, endless steel chain. It is evident, therefore, that considerable friction is developed within the working parts of the endless steel chain as well as against the chain channels along which it is "dragged" through the conveyor system. As hereinafter employed, working parts refers to those linkage structures effecting an interconnection of individual steel links to form the flexible, endless steel chain.

In conveyor systems of the drag-chain type, the problem of lubrication of the endless steel chain and, more particularly, the working parts thereof has veen ever present. In addition, and especially in plants processing items for human consumption, container package soilage which is a condition creating anything but an impression of dependable sanitation must be avoided. In the event that container package soilage results, considerable expenditures are necessary to clean such container packages prior to a distribution thereof to the consumers. Accordingly, and to satisfy both requirements, soap-type lubricants have been generally employed in lieu of oil lubricants, which are perhaps better lubricants. In instances where soap-type lubricants are employed, however, the container packages as well as the plant and clothes of the workmen are kept clean at the expense of a thorough lubrication of the endless steel chain.

Poor lubricants, however, both the oil-type and soap-type usually build up heavy deposits on the endless steel chain which result in sluggish and jerky operation not to mention excessive wear of the working parts thereof. Such deposits not only increase the cost of operation of the conveyor system, i.e., power consumption, but cause a more rapid wear of the chain structure as well as objectionable odors in the plant. Conditions such as these necessitate repeated and time-consuming efforts to clean such deposits, as well as premature replacements of the endless steel chain.

Prior art methods of applying soap-type lubricants to conveyor systems of the drag-chain type are ineffective. For example, in one such method, a soapy solution is applied directly to the endless steel chain; a large portion of the solution so applied falls from the endless steel chain and is wasted. This method depends on flexations of the endless steel chain to agitate or produce foam for lubricating the moving parts. The resultant foam, however, is light and does not effect lubrication. For example, little or no foam is provided to effect a lubrication of the side and face portions of the endless steel chain. Another such method employs a revolving brush to pick up foam produced upon the agitation of a soap solution and apply it to the endless steel chain. While this latter method effects a better lubrication of the endless steel chain, only a very small percentage of such foam enters into and lubricates the working parts thereof; in addition, the soap solution soon becomes fouled and must be frequently changed.

Accordingly, it is an object of this invention to provide an improved and more efficient lubricating system for conveyor systems of the drag-chain type.

A further object of this invention is to provide a lubricating system wherein a positive lubrication of the working parts of an endless steel chain, i.e., the linkages or bearing points, is assured.

These and other objects are achieved in accordance with the principles of this invention by the application of a foam lubricant directly to working parts of an endless steel chain, such lubricant being applied under pressure and in a lubricating chamber through which such chain is directed. More particularly, the foam lubricant is provided under pressure to an orifice flush with the base of the lubricating chamber and over which the endless steel chain is adapted to pass. According to one feature of this invention, the individual links of the endless steel chain in passing over such orifice operate as a slide valve to release the foam lubricant under pressure directly into the working parts thereof. The working parts are, thereupon, completely lubricated by the flexations of the endless steel chain in traversing the conveyor system. According to another feature of this invention, the orifice is provided with an enclosed lubricating chamber whereby surplus foam lubricant is confined and distributed over the endless steel chain. The surplus foam lubricant is carried along to lubricate the endless steel chain with respect to the chain channels, including curve-wheels and/or friction curves, of the conveyor system.

Figure 2:
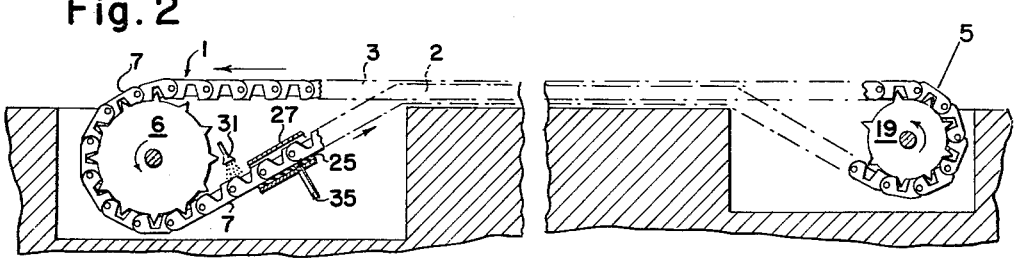

A fuller appreciation of this invention will be had upon a consideration of the detailed description hereinafter set forth when taken in conjunction with the drawings wherein:

FIGURE 1 is a schematic perspective view of illustrative embodiment of this invention; FIGURE 2 is a side view of a typical conveyor system of the drag-chain type; and FIGURES 3, 4, 5 and 6 are detailed views to facilitate an understanding of the structure by which the foam lubricant is applied directly to the working parts of the endless steel chain.

Referring now to the drawings wherein corresponding parts are similarly designated, a typical conveyor system of the drag-chain type is illustrated which comprises a driven endless steel chain 1 suitably supported in a return chain channel 2 and a carrying chain channel 3. The return channel 2 and the carrying channel 3 define the path of travel of the chain 1 through the conveyor system. The return channel 2 and the carrying channel 3, as illustrated, are parallelly disposed on substantially the same plane, the latter being slightly elevated with respect to the former. Such disposition of the return channel 2 and the carrying channel 3 allows for a lower structural elevation of the conveyor system. The container packages to be transported are supported on the carrying chain, i.e. that portion of the chain 1 supported in the carrying channel 3, which extends slightly above the raceway of the carrying channel 3. In addition, although not illustrated, pipe guards, drag bars, as well as curve-wheels and/or friction curves may be provided along the carrying channel 3 to guide the container packages.

Considerable friction is generated by the chain 1 along the conveyor system against both the return channel 2 and the carrying channel 3. For example, the face portion 7 of the chain 1 is subjected to both friction and abrasion against the bottom of return channel 2 and, similarly, the base or lower portion thereof is subjected to such effects against the bottom of carrying channel 3. With respect to carrying channel 3, this condition is aggravated by the added weight of the container packages.

In addition, although not illustrated, numerous curves may be provided along the conveyor system, either of the friction or curve-wheel type, whereby the side faces of the chain 1 are also subjected to friction and abrasion. Accordingly, the chain structure must be lubricated on its face, sides and bottom portions to reduce this friction drag. Also, and most important to the long wear of the chain 1, the working parts, i.e. link connectors or bearing points, must be completely lubricated.

Referring now to FIGURES 3, 4, 5 and 6, the structure of the endless steel chain is illustrated in detail. The chain 1 comprises a suitable plurality of individual steel links 5; each link is a unitary structure having a sprocket cavity 21 including a septating member 23 adapted to engage the drive sprocket wheel 6 and the take-up sprocket wheel 19. Also, each link 5 is provided a single tongue extension 9 and a pair of oppositely disposed tongue extensions 11 and 13. Each of the tongue extensions 9, 11 and 13 are provided an eyelet, as illustrated, through which a linkage pin is inserted. The single tongue extension 9 of each of the links 5 is advantageously juxtapositioned between tongue extensions 11 and 13 of a next adjacent link 5 whereby the eyelets therein are aligned to allow the insertion therethrough of the linkage pins 15. The linkage or interconnecting pins 15 are pressed-fit into the eyelets provided the tongue extensions 11 and 13. However, with respect to the eyelet provided the tongue extension 9, the elongated configuration and dimensions are such as to provide a slight longitudinal and lateral motion as well as a rotary motion to the linkage pin 15 inserted therein. The resultant chain 1 is, accordingly, provided sufficient flexibility for traversing the conveyor system.

Figure 4:
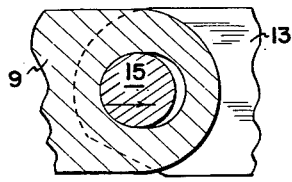
Figure 5:
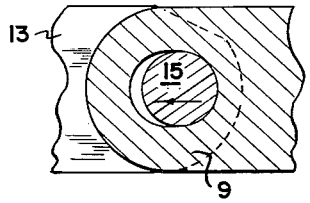
Figure 6:
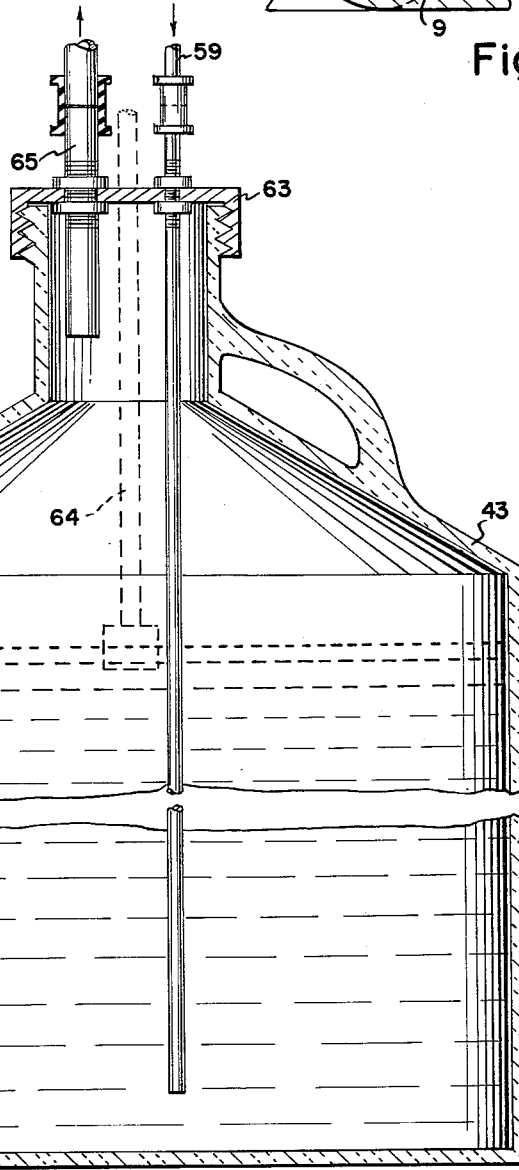

It is evident, however, that the linkage pins 15, i.e. the working parts, of the chain 1 are subject to great wear. For example, consider the chain 1 as it is driven along the conveyor system by the drive sprocket wheel 6. On leaving the underside of the drive sprocket wheel 6, the chain is, in effect, operative as a push chain. In such instance, the position of the linkage pin 15, illustrated in FIGURE 4, is displaced to the extreme left of the eyelet provided to the tongue extension 9. However, on passage around the take-up sprocket wheel 19, the chain 1 is operative, in effect, as a pull chain whereby the interconnecting pin 15, illustrated in FIGURE 5, is displaced to the extreme right of the eyelet provided the tongue extension 9. It is therefore evident that the linkage pin 15 is displaced to numerous positions within the eyelet provide the tongue extension 9 on the chain 1 passing through the conveyor system. For instance, such displacement results from the operation of the chain 1 as a push chain or pull chain, or the effects of curves, either of the friction or curve-wheel type, provided through the conveyor system. In lubricating systems heretofore employed, little or no soap-type lubricant found its way to the linkage pins 15 and, accordingly, a premature wear of the chain 1 resulted.

Referring particularly to FIGURE 2, the chain 1 is, therefore, directed as a push chain from the underside of the drive sprocket wheel 6 and along the return channel 2 upon a channel liner 25. The channel liner 25 is provided along the bottom of the return channel 2 and, also, the carrying channel 3 as a wearing strip for chain 1. A portion of the return channel 2 in near proximity to the underside of the drive sprocket wheel 6 is provided a top metal guide 27 which advantageously form a lubricating chamber 29. In passage through the lubricating chamber 29, the substantially flat face portion 7 of the individual links 5 are in weight contact with the liner 25.

Figure 3:
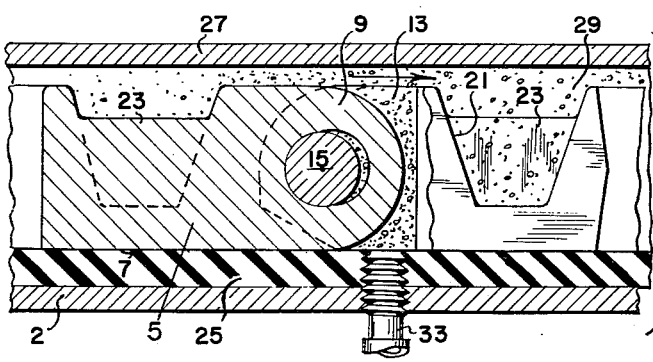

Referring now to FIGURES 1 and 3, a nipple 33 is threadedly inserted at a convenient angle into the base of the return channel 2 and extends through and flush with the liner 25. A lubricating supply tube 35 is connected to the nipple 33 and through a control valve 37 to a source of foam lubricant in the form of distributor pipe 39. The distributor pipe 39 is branched through the agency of T-coupler 41 to any number of lubricating chambers identical to the lubricating chamber 29 hereinabove described.

The distributor pipe 39 extends from a lubricant supply unit which is illustrated in FIGURE 1 as comprising a container 43 of the soapy solution source of foamed lubricant to be applied, a source of compressed air in the form of a compressor 45 and an electric motor 47, and a compressed air supply pipe 49 having therein a pressure regulating valve 51 and a solenoid valve 53. As now to be described, the lubricant supply unit is operative to direct a soap-type or foam lubricant under pressure along the distributor pipe 39.

The lubricant supply unit is driven by the motor 47 coupled to the compressor 45. The compressor 45 is provided with air intake valve 55 and operates to direct compressed air along the air supply pipe 49 and through the pressure regulating valve 51 and solenoid valve 53. The pressure regulating valve 51 is adjustable to effect an accurate control of the air passing therethrough from the compressor 45 to the lubricating supply unit. The solenoid valve 53, on the other hand, is connected in parallel with the conveyor drive motor, so as to turn the lubricant supply on or off simultaneously with the starting and stopping of the conveyor.

The air supply pipe 49 is connected from the solenoid valve 54 to a T-coupler 57 which effectively divides the stream of air between a feedpipe 59 through which air is supplied to the container 43, and, also, a bypass pipe 59' having a control regulating valve 61 therein. The feedpipe 59 is rigidly supported in the cap or cover 63 and extends to the near bottom of the container 43. Similarly mounted in the cap 63 is the outlet pipe 65 of larger diameter than the feedpipe 59. The other end of the output pipe 65 and the supply pipe 59 are connected at the T-coupler 67, the remaining connection of the T-coupler extending to the distribution pipe 39. Also, if desired, a float gauge 64 may extend through the cap 63 for determining the level of the soapy solution in the container 43.

Thus, when compressed air is directed along the feedpipe 59 to the bottom of the container 43, it bubbles up through a soapy solution to form a body of dense foam at the top of the container. This foam passes out of the container 43 and along the output pipe 65. At the T-coupler 67, the confluence of the foam along the output pipe 65 and the air along the bypass pipe 59' carries such foam along the distributor pipe 39 under pressure to the lubricant supply tubes 35 extending into the lubricating chambers 29.

In the proper operation of the lubrication system herein disclosed, most of the air directed along the air supply pipe 22 continues along the connecting pipe 59' to the distributor pipe 39. By regulating the valve 61, only enough air is forced into the container 43 to maintain a sudsing of the soapy solution therein and to allow for a pressure buildup whereby the resultant foam is forced into the output pipe 65. Accordingly, the regulating valve 61 maintains a balance in the present system for determining the amount of foam lubricant to be directed to the distribution pipe 39. The control valves 37 are advantageously provided to effect a selection of particular conveyor systems to be lubricated by the instant system.

As particularly illustrated in FIGURE 3, the upper or flat face portion 7 of each of the links 5 of the chain 1 are adapted to pass over and effect a slide valve control of the orifice provided the nipple 33 connected to the lubricant supply tube 35. As illustrated, the links 5 are each maintained in weight contact with the liner 25 and, during the passage of the face portion 7 over the above-mentioned orifice, the foam lubricant is not injected into the lubricating chamber 29. However, upon the passage of the working parts (see FIGURE 3) of the chain 1 over such orifice, the built up pressure in the lubricant supply unit, i.e. the lubricant supply tube 35, is released directly on the working parts of the chain 1. The release of this pressure carries the foam lubricant directly into the working parts of the chain 1. For example, if the inner diameter of the orifice provided the nipple 33 is greater than the cross dimension of the single tongue extension 9 and centrally disposed in the return channel 2, such release of pressure is effected while the working parts of the chain 1 are positioned over the orifice. In addition, the surplus foam injected at this time is confined in the lubricating chamber 27 and distributed over the sides and bottom, i.e. sprocket cavities 21, of the chain 1, to effect a complete and total lubrication of all contact surfaces of the chain 1. The foam lubricant so injected is further worked into the working parts by the displacement of the linkage pins 15 due to the flexations of the chain 1 along the conveyor system. Accordingly, at all times the working parts of the chain are totally lubricated.

Upon each link 5 of the chain 1 having traversed the conveyor system and prior to the re-entrance thereof into the lubricating chamber 29, it is subjected to a washing operation by the nozzle 31. The nozzle 31, as illustrated, directs a stream of water under pressure upon the chain 1 to remove previously used foam lubricant and, also, other foreign materials which may have been accumulated thereon.

As hereinabove described, only the foam lubricant and not the actual coapy solution is applied to the chain 1 as in prior art practices. Due to the wasteful usage of the soapy solution in prior art practices, it was objectionably expensive to use distilled water and/or antifreeze agents therein. Accordingly, and particularly in hard water areas, water minerals are deposited on the chain 1 which eventually impair the proper functioning of the conveyor system. In such instances, sequestering agents are added to the soapy solution to inhibit such deposits which added to operating costs. Further, since it has been impractical to add antifreeze agents, the conveyor system so lubricated could not be used out of doors in freezing weather as the soapy solution would freeze when the system is turned off resulting in damage to the chain 1 at start up. It is evident, however, that the conservative usage of the soapy solution in the system hereniabove described allows for the use of distilled water and/or antifreeze agents therein. I have found that a practical soapy solution for the practice of this invention to be a high quality coconut oil soap, for example, a product of E. F. Drew & Co., Inc. of Boonton, New Jersey, called "Drew Lube Liquid," to which is added three parts of distilled water. In the event that the conveyor system is to be exposed to freezing temperatures, propylene glycol is substituted for one part of the distilled water; such solution will prevent freeze-up of the working parts of the conveyor system to temperatures of −20° Farenheit.

I claim:

1. A system for lubricating a flexible structure having a plurality of links interconnected by linkage means, each of said interconnected links having a substantially flat face portion which is discontinuous at said linkage means comprising channeling means having a base portion for receiving said flexible structure, foamed lubricant injecting means rigidly supported in said base portion, means for providing foamed lubricant under pressure to said foamed lubricant injecting means, and means for transporting said flexible structure along said channeling means such that said face portions are in contact with said base portion and pass over said foamed lubricant injected means whereby a slide valve control of said foamed lubricant injecting means is effected by successive ones of said links.

2. In a system as set forth in claim 1 further including means for enclosing said channeling means and said foamed lubricant injecting means to provide a chamber whereby excess foamed lubricant directed therein under pressure is distributed over said flexible structure.

3. In a system for lubricating a flexible structure having a plurality of links of substantially flat face portion interconnected by linkage means comprising means for providing foamed lubricant under pressure and including injection nozzle means, and means for directing said interconnected links over said injection nozzle means such that successively appearing face portions effect a slide valve control of said injection nozzle, means whereby foamed lubricant under pressure is directed to said linkage means.

4. In a system as set forth in claim 3 further including means for distributing surplus foamed lubricant directed to said linkage means over said flexible structure in passage over said injection nozzle.

5. A lubricating system for lubricating a flexible structure having working parts comprising means for providing foamed lubricants under pressure, means for distributing said foamed lubricant so provided, chamber means for receiving said flexible structure, means connected to said distributing means for injecting said foamed lubricant into said chamber means, and means for controlling said injecting means such that said foamed lubricant is injected under pressure into said chamber means directly onto said working parts, said chambering means being adapted to confine surplus foamed lubricant so directed for distribution over said flexible structure.

References Cited in the file of this patent

UNITED STATES PATENTS

| | | |
|---|---|---|
| 1,192,762 | Dodge | July 25, 1916 |
| 1,777,398 | Cudihy | Oct. 7, 1930 |
| 2,304,571 | Joa | Dec. 8, 1942 |
| 2,330,802 | Andersen | Oct. 5, 1943 |
| 2,367,354 | Kanter | Jan. 16, 1945 |
| 2,548,739 | Peck | Apr. 10, 1951 |
| 2,558,370 | Miller | June 26, 1951 |
| 2,604,199 | Govan | July 22, 1952 |
| 2,670,069 | Dobkin | Feb. 23, 1954 |

FOREIGN PATENTS

| | | |
|---|---|---|
| 485,668 | Italy | Oct. 16, 1953 |